May 7, 1963    H. CHILTON    3,088,758

THERMOCOMPENSATING JOINT

Filed Jan. 29, 1959            2 Sheets-Sheet 1

INVENTOR

HARRY CHILTON

BY *Lawson and Taylor*

May 7, 1963 H. CHILTON 3,088,758
THERMOCOMPENSATING JOINT
Filed Jan. 29, 1959 2 Sheets-Sheet 2

INVENTOR
HARRY CHILTON

BY Larson and Taylor

3,088,758
THERMOCOMPENSATING JOINT
Harry Chilton, Didcot, England; Hilda Joan Brown, executrix of said Harry Chilton, deceased, assignor to United Kingdom Atomic Energy Authority, London, England
Filed Jan. 29, 1959, Ser. No. 789,954
Claims priority, application Great Britain Feb. 12, 1958
2 Claims. (Cl. 285—187)

This invention relates to joints and has one application in flanged joints used to interconnect lengths of pipe.

Joints between lengths of pipe can be made by lapping the end-surfaces of the flanged pipes and clamping the lapped surfaces together by bolts passing through flanges on the pipes. Such joints are satisfactory over a wide temperature range provided that the bolts and the two flanged pipes have similar coefficients of thermal expansion. Difficulties arise, however, when it is desired to join two pipes made of materials having coefficients of expansion different from that of the bolts which clamp the flanges together. For example, if steel bolts are used to clamp together two lengths of graphite pipe, the end-surfaces thereof will tend to separate at high temperatures owing to the low coefficient of expansion of the graphite compared with the steel bolts, so that the joint loosens and leaks. A similar difficulty arises in joining a steel pipe to a graphite pipe using steel bolts. In principle spring-loaded bolts could be used to overcome this difficulty, but suitable springs would be impracticably large and in any case springs are not satisfactory at high temperatures.

It is one object of the present invention to provide a joint in which this tendency for the surfaces to separate due to differences in the thermal expansion coefficients of the materials involved is minimised.

According to the present invention in a joint between two members comprising plane surfaces thereof held in contact by clamping means having a thermal expansion coefficient different from at least one of said members, the clamping pressure is applied to said one member substantially in the contact plane of said surfaces.

At least said one member may be provided with a flange to which the clamping pressure is applied. Said one member may be a pipe whereof an end-surface constitutes one of said plane surfaces.

To enable the nature of the present invention to be more readily understood, attention is directed to the accompanying drawings wherein.

Figure 1:
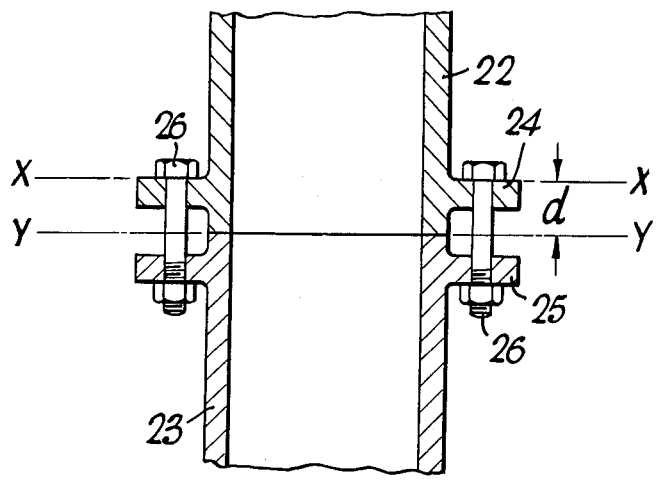
FIG. 1 is a sectional elevation of a simple flanged pipe joint of a known type.

FIG. 1 shows a simple form of pipe joint in which the lapped end-surfaces of two pipes 22 and 23 meet in the sealing plane Y—Y. The pipes 22 and 23 have integral flanges 24 and 25 respectively, and are clamped together by clamping means constituted by bolts 26 which pass through holes in the flanges and apply pressure to flange 24 in the plane X—X.

If pipe 22 has the same thermal expansion coefficient as pipe 23 and bolts 26, the tightness of the joint is unaffected by temperature changes. If, however, pipe 23 and bolts 26 are made of steel for example, but pipe 22 is made of graphite, then if the temperature of the joint is changed by an amount $\Delta T$ the end-face of the graphite pipe 22 will tend to move axially relative to the end-face of the steel pipe 23 by an amount $$d \times (\alpha_s - \alpha_g) \Delta T$$

where $d$=distance between planes X—X and Y—Y, and $\alpha_s$ and $\alpha_g$=the thermal expansion coefficients of steel and graphite respectively, and the joint will loosen.

Figure 2:
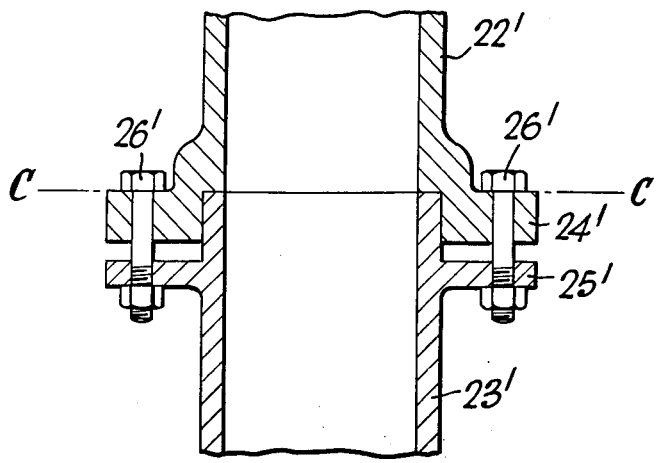
FIG. 2 is a sectional elevation of a flanged pipe joint embodying the present invention.

In the joint shown in FIG. 2, pipe 22' having flange 24' is made of graphite and pipe 23' having flange 25', together with bolts 26', are made of steel. In this joint, however, the aforementioned tendency for axial movement is eliminated by reducing the distance "$d$" to zero, i.e. by making the sealing plane Y—Y and the clamping pressure plane X—X of FIG. 1 coincide in the plane C—C of FIG. 2.

Figures 3, 4:
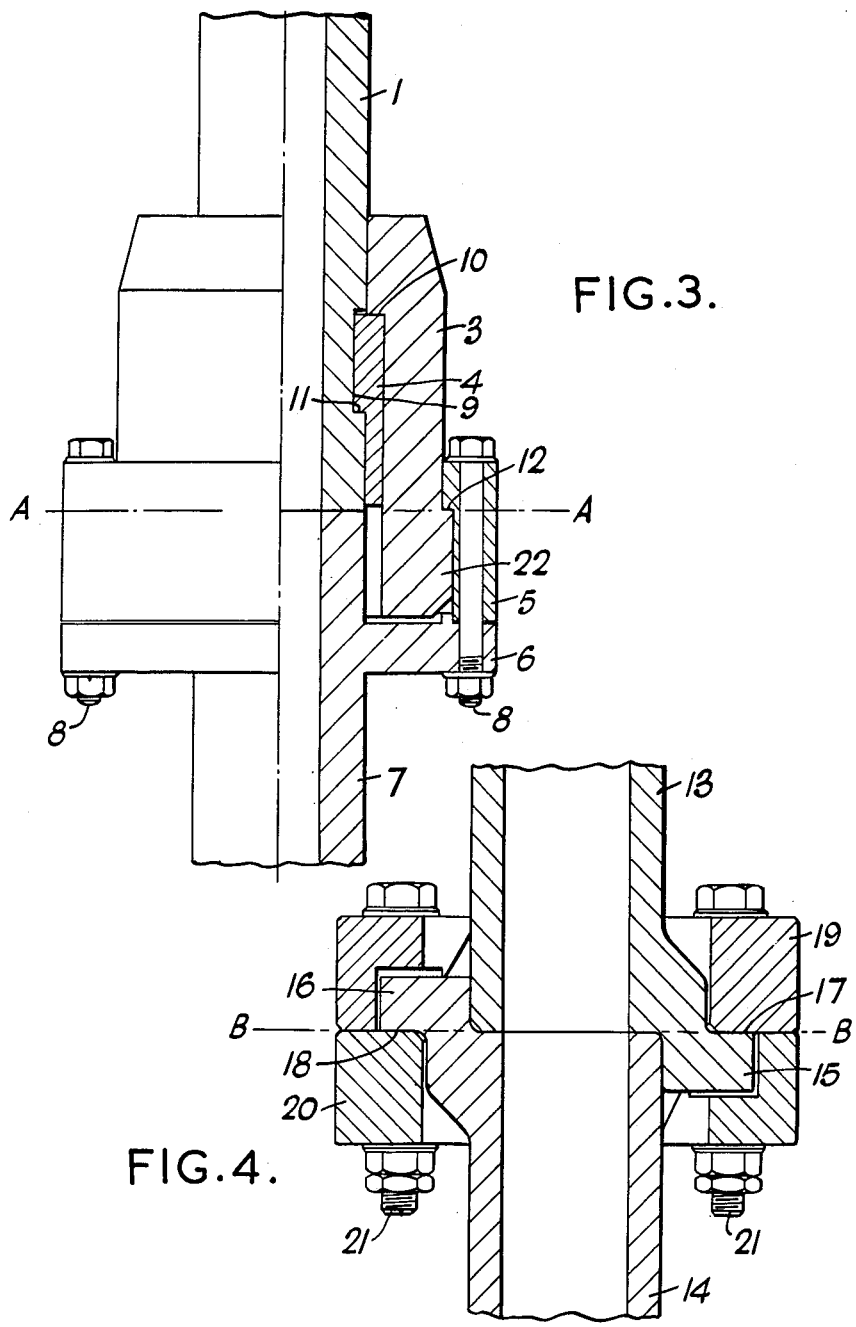
FIG. 3 is a half-sectional elevation of another flanged pipe joint embodying the invention.
FIG. 4 is a sectional elevation of yet another flanged pipe joint embodying the invention.

FIG. 3 shows a form of construction in which the flange on the graphite pipe is more conveniently fabricated than the integral flange 24' of FIG. 2 and which allows access to the end-surface of the graphite pipe for ease of lapping. In FIG. 3, the lapped end-surfaces of graphite pipe 1 and of a steel pipe 7, meet in a plane A—A. Pipe 7 has near its end a flange 6, and near the end of pipe 1 is an annular recess 9. A graphite inner sleeve 4, which is split in two halves to allow it to be fitted round the pipe, is held in the recess 9 by a graphite outer sleeve 3 which can slide on the pipe 1. Sleeve 3 can exert axial pressure on sleeve 4 at surface 10 and sleeve 4 transmits this pressure to the pipe 1 at surface 11. Round the outer surface of the sleeve 3, in the plane A—A, is a lip 12. Hence sleeves 3 and 4 effectively provide a flange 22 on the end of pipe 1. Pressure is applied to flange 22 by clamping means comprising a steel clamping ring 5 which engages with lip 12, and steel bolts 8 which pass through holes in flange 6.

Assuming the joint to be tightened to the correct pressure at room temperature (a process which may be aided by inserting or removing suitable shims between flange 6 and ring 5), if the joint is heated, the pipe 7, bolts 8, and ring 5 (all of which must have substantially the same expansion coefficient) will expand more than the graphite parts. However because ring 5 applies pressure to the flange 22 (at lip 12) in the same plane A—A as that in which the lapped ends of the pipe meet, the arrangement is in effect the same as that of FIG. 2 and there is no tendency for the end faces to separate.

In FIG. 4 pipes 13 and 14, which may be of the same material (e.g. graphite), or of two materials having different expansion coefficients, have lapped end-surfaces meeting in a plane B—B. In this case the pipes have integral flanges 15 and 16 respectively, which are each interrupted to form three 60° sectors divided by 60° gaps, thus allowing the flanges to be interleaved as shown. Pressure is applied to both flanges in the plane B—B, via surfaces 17 and 18, by steel clamping rings 19 and 20 respectively, which are held together by steel bolts 21. It will be seen that in this case changes in the dimensions of either pipe relative to the steel bolts and clamping rings do not result in relative axial movement of the end faces.

The principle of operation of joints according to the invention requires that all parts of the joint assembly must be at the same temperature, and design and installation should satisfy this condition as far as possible, e.g. by adequate lagging. The condition would also be violated by severe thermal shocks such as might be caused by a sudden change in the temperature of the fluid in the pipes. Furthermore the invention does not prevent relative radial movement of the end-surfaces, but radial movement is a less serious factor than axial movement in producing leaks.

Although the invention has been described by way of example with reference to pipe joints, it will be appreciated that it has other applications, e.g. fastening a plate over an aperture in a vessel, or joining a pipe to a vessel.

I claim:
1. A thermocompensating joint for joining two pipe members having different coefficients of thermal expansion, comprising a first pipe member having an end surface and a second pipe member having a shoulder formed therein for engaging said end surface, said shoulder and end surface being disposed on opposite sides of a plane, a portion of said second member extending over the side of the plane on which the shoulder is disposed, the said portion defining a second surface area disposed in said plane, and means disposed parallel to the axis of and having the same coefficient of thermal expansion as said first member in pressure engagement with said second surface area and with said first member to clamp the said members together.

2. A thermocompensating joint according to claim 1 wherein the portion of the second member defining the second surface area comprises a flange integral with said second member, and said means pressure engages said second surface area normal to said plane and in the direction of the side of the plane on which the first member is disposed.

References Cited in the file of this patent

UNITED STATES PATENTS

| | | |
|---|---|---|
| 935,412 | Rust | Sept. 28, 1909 |
| 1,295,263 | Blom | Feb. 25, 1919 |
| 1,304,197 | Nyquist | May 20, 1919 |
| 1,365,530 | Moon | Jan. 11, 1921 |